(12) United States Patent
Gierer et al.

(10) Patent No.: US 6,544,139 B1
(45) Date of Patent: Apr. 8, 2003

(54) ELECTRONIC-HYDRAULIC CONTROL FOR AUTOMOBILE DRIVE SYSTEMS WITH AUTOMATIC GEAR SHIFTING

(75) Inventors: Georg Gierer, Kressbronn (DE); Thilo Schmidt, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/831,545
(22) PCT Filed: Dec. 13, 1999
(86) PCT No.: PCT/EP99/09851
§ 371 (c)(1),
(2), (4) Date: May 10, 2001
(87) PCT Pub. No.: WO00/37835
PCT Pub. Date: Jun. 29, 2000

(30) Foreign Application Priority Data

Dec. 18, 1998 (DE) .......................................... 198 58 541

(51) Int. Cl.$^7$ ................................................. F16H 31/00
(52) U.S. Cl. ...................................... 475/119; 475/116
(58) Field of Search ................................... 475/119, 116

(56) References Cited

U.S. PATENT DOCUMENTS

| 5,417,626 A | 5/1995 | Gierer | 477/117 |
|---|---|---|---|
| 6,350,214 B1 | 2/2002 | Murasugi | 475/128 |
| 6,394,926 B1 | 5/2002 | Jang | 475/116 |
| 6,398,684 B1 | 6/2002 | Kaizu | 475/127 |

FOREIGN PATENT DOCUMENTS

| DE | 38 36 421 A1 | 3/1988 |
|---|---|---|
| DE | 37 29 627 A1 | 5/1989 |
| DE | 35 32 784 C2 | 11/1989 |
| DE | 33 31 937 C2 | 5/1996 |
| EP | 0 440 748 B1 | 9/1993 |
| WO | 84/00522 | 2/1984 |
| WO | 90/04732 | 5/1990 |

*Primary Examiner*—Dirk Wright
(74) *Attorney, Agent, or Firm*—Davis & Bujold, P.L.L.C.

(57) ABSTRACT

Electronic-hydraulic control device of an automatic automobile transmission in which all of the solenoid valves (12) and pressure control valves (6, 7, 8, 9, 10, 11) are de-energized when the electronic control device fails and in which a lower gear, preferably third gear, is automatically selected when a lower gear has been previously engaged, and a higher gear, preferably fifth gear, is selected when a higher gear has been engaged previously. The control valves (20, 21, 23) have surfaces of different dimensions that can be controlled jointly or individually to permit a variety of valve characteristic curves.

21 Claims, 3 Drawing Sheets

| SPEED | CLUTCH | | | BRAKE | |
|---|---|---|---|---|---|
| | A | B | E | C | D |
| 1 | ● | | | | ● |
| 2 | ● | | | ● | |
| 3 | ● | ● | | | |
| 4 | ● | | ● | | |
| 5 | | ● | ● | | |
| 6 | | | ● | ● | |
| R | | ● | | | ● |

| GG | 12 | 6 | 7 | 8 | 9 | 10 | 11 |
|---|---|---|---|---|---|---|---|
| | | | | | | | |
| 1 | – | X | – | – | X | – | X |
| 2 | – | X | – | X | – | – | X |
| 3 | – | X | X | – | – | – | X |
| 4 | X | X | – | – | X | – | X |
| 5 | X | – | X | – | X | – | X |
| 6 | X | – | – | X | X | – | X |
| | | | | | | | |
| P | – | – | – | – | X | – | – |
| R-S | w.w. | – | – | – | – | – | – |
| R | – | – | X | – | X | – | – |
| N | – | – | – | – | X | – | – |

Fig. 4

ELECTRONIC-HYDRAULIC CONTROL FOR AUTOMOBILE DRIVE SYSTEMS WITH AUTOMATIC GEAR SHIFTING

FIELD OF THE INVENTION

The invention relates to an electronic-hydraulic control device of an automatic automobile transmission in, which frictional clutches or brakes that can be engaged or released are controlled to shift individual gears by pressurizing the actuators depending on the operating parameters of the automobile transmission and a drive motor as well as on devices for influencing the gear shift operation and/or drive program.

BACKGROUND OF THE INVENTION

An electronic-hydraulic control device of an automatic automobile transmission of the type described above is known from EP 0 440 748 B1. In this control system a control valve is associated with each actuating device and the solenoid valves and shifting valves, which are used to drive the control valves can perform multiple functions. The control device of this transmission control has a fault-monitoring device in which an associated solenoid valve or pressure control valve is controlled in such a way when the error signal appears that the automobile transmission is in idle at least phasewise. An automobile must be able to continue traveling even if there is a defect in the electronic control.

SUMMARY OF THE INVENTION

The goal of the invention is to create an electronic-hydraulic transmission control for an automatic transmission, preferably a six-speed transmission, in which the clutches or brakes of the transmission can be controlled by an electronic control device and in which an emergency gear is automatically selected if the electronic control device fails, which is designed such that when traveling in the upper transmission speeds (4 to 6), a higher gear is selected in case of failure, and during travel in the lower speeds (1 to 3), a shift is made to a lower gear in the event of a defect.

This goal is achieved by a type-compliant electronic-hydraulic transmission control with the characterizing features of the main claim in which the clutches or brakes can be controlled directly by the electronic control device by driving electrical pressure control valves or electrical solenoid valves which in turn control hydraulic valves that pressurize the clutches or brakes depending on the control pressure of the electrical pressure control valves. The solenoid valves or electrical pressure control valves in the de-energized state always assume a predetermined position in which the emergency gear is selected by corresponding valve combinations. This is necessary since even when the electronic control device fails, travel must still be possible. By the solenoid valves and electrical control valves assuming a predetermined position in the de-energized state in an emergency case, the clutch or brake to be engaged for the emergency gear is not subjected to a controlled pressure but to the full system pressure. In order to prevent thermal loading of the emergency gear clutches, the shift from the previous gear to the emergency gear must not be too high. For this reason, the control valves are switched so that in case of a previously used upper gear, preferably the fourth to sixth gear, in case of an upper gear, the fifth gear is selected, and during travel in the lower gears, preferably one to three, a shift is made to a lower gear, preferably the third gear. Reverse can be selected directly during the emergency operation by shifting the selector lever. Since gears can no longer be shifted when traveling in an emergency gear, it is possible that when the fifth gear is engaged as the emergency gear, the vehicle can no longer start in this fifth gear, for example after braking at a traffic light. By lowering the system pressure shortly to zero, for example by switching off the combustion engine, the control valves are switched so that when re-starting the combustion engine, the third gear is automatically selected when the electronic control device is defect. Since this electronic-hydraulic transmission control is preferably used for a six-speed automatic transmission, the control valves controlling the clutches and brakes are designed with two different valve characteristic curves. This is necessary since in a six-speed automatic transmission, the clutches or brakes must be operated at different speeds in order to shift gears in combination with other clutches or brakes. Thus a clutch is actuated in both the third and fifth gear for engaging the gears. However, since the torque on the clutch in a lower gear is different from the torque of the same clutch in an upper gear, it is necessary to subject the actuator of this clutch to different pressures depending on the speed selected.

Depending on the gear combination, the control valves are either pressurized by only one surface or, if a second valve characteristic curve is required, the control valves are pressurized by another surface, with the surface of one pressurized side being different from the other side. This results in a different clutch pressure while the control pressure remains the same.

BRIEF DESCRIPTION OF THE DRAWING(S)

Further embodiments of the invention can be found in the description of the figures.

FIG. 4 is a table in which the shifted solenoid and electrical control pressure valves for each shifted speed are shown.

DETAILED DESCRIPTION OF THE INVENTION

Figures 1, 2:
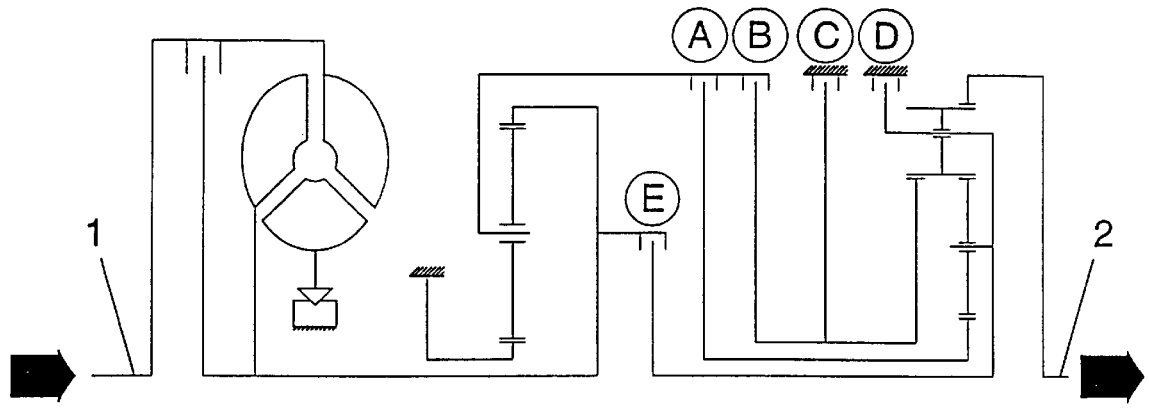
FIG. 1 shows a transmission diagram of a six-speed transmission.
FIG. 2 shows a table of the frictional clutches and brakes operated in the individual gears.

FIG. 1: This transmission diagram shows a six-speed planetary-type transmission in which drive shaft 1 is driven by a combustion engine, not shown. Drive shaft 1 is connectable with drive shaft 2 by clutches A, B, E and brakes C and D. The shifted clutches or brakes for the corresponding gears are shown in FIG. 2.

FIG. 2: In the table shown it is evident which clutches and brakes must be closed to engage the specific gears.

Figure 3:
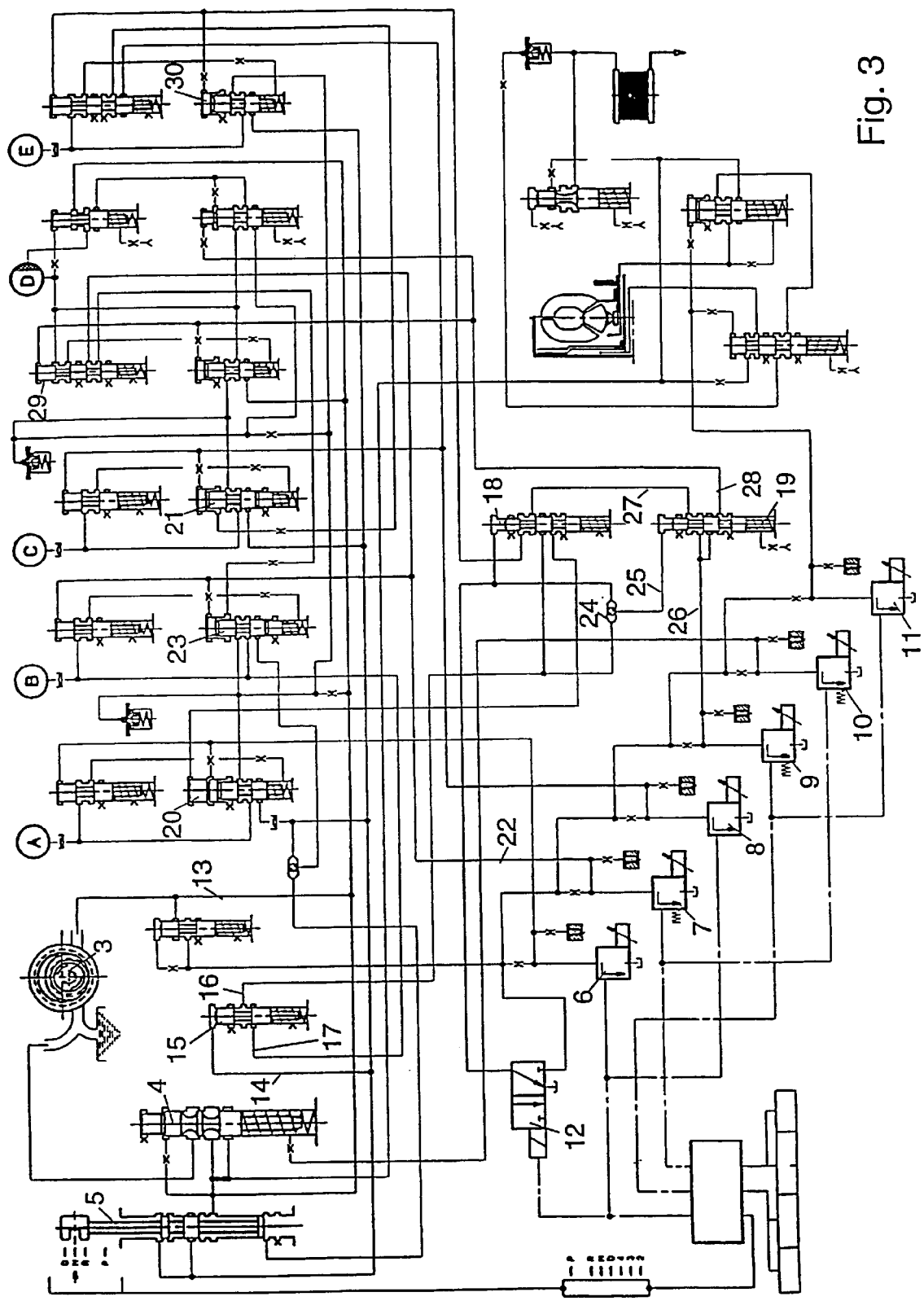
FIG. 3 is a simplified control diagram of the control device according to the invention.

FIG. 3: A pump 3 is driven by a combustion engine, not shown, that supplies the system pressure for the electronic-hydraulic transmission control. The system pressure is regulated by system pressure valve 4. When the selector is moved into a forward travel position, depending on the parameters of the combustion engine and the automatic transmission, the electrical control pressure valves 6, 7, 8, 9, 10, 11 and solenoid valves 12 are controlled, as shown by the table in FIG. 4. For example, if the second gear is engaged, pump 3 supplies the control with pressure medium through channel 13 at a predetermined level. controlled by the system pressure valve. The reverse valve 15 is controlled by channel 14 connecting channel 16 with channel 17. The electronic control device checks that the gear selection is permitted and then controls the electrical pressure control valves 6, 8, and 11. In this state, emergency travel valve 18 and shift valve 19 are in their initial positions. Control valve 20 is switched and clutch A is closed. This selects the second gear. If a defect in the electronic control device occurs in gears 1 to 3, solenoid valves 12 and electrical pressure control valves 6, 7, 8, 9, 10, 11 are de-energized. Since pressure control valve 7 is deenergized, electrical pressure control valve 7 is switched by its spring so that control valve 23 is controlled through channel 22 and clutch B closes without feedback control. Since reverse valve 15 is still pressurized, channel 17 is connected with channel 16 and the pressure acting on the actuator of clutch B is passed through emergency travel valve 18 to control valve 20. Control valve 20 is thus pressurized so that clutch A remains closed. Likewise, valve 24 is switched and channel 25 is pressurized by channel 16. Shift valve 19 is controlled so that the connection is switched from channel 26 to channel 27 while channel 28 has zero pressure. Consequently, control valve 29 is switched and clutch D is opened with zero pressure. This ensures that if the electronic control device fails in one of the lower gears, the third gear is automatically engaged in an emergency situation. If a failure in the electronic control device occurs when one of the upper gears is engaged, electronic pressure control valves 6, 7, 8, 9, 10, 1 1 and solenoid valves 12 are de-energized. As described above, electrical pressure control valve 7 is switched by its spring and clutch B is closed. When one of the upper speeds 4, 5, and 6 is engaged, solenoid valve 12 is energized during normal operation of the electronic control device.

For this reason, When a fault occurs in the electronic control device, the emergency travel valve 18 is still pushed against its spring. Since in its de-energized state the electrical pressure control valve 9 is controlled so that channel 26 is pressurized and switching valve 19 remains controlled since valve 24 is controlled by reverse valve 15, the pressure from channel 26 works on the differential surface in emergency travel valve 18 holding emergency travel valve 18 in its lower position. Control valve 30 is controlled by channel 27 and emergency travel valve 18 so that clutch E remains closed. This ensures that when there is a fault in the electronic control device and an upper gear is engaged, anautomatic shift to fifth gear is made. If the vehicle is fully stopped while in this engaged fifth emergency gear, it is no longer possible under certain conditions to produce sufficient torque in fifth gear to start again. For this reason, the system pressure must be interrupted for a short time, which can be accomplished by shutting off the combustion engine or by manually switching another valve. Emergency travel valve 18 then enters its initial position and third gear is automatically engaged again when the engine restarts and the driving position is selected.

In another embodiment of the invention, the control valves associated with the clutches and brakes can be pressurized on both sides. However they have different surfaces on the two sides so that it is possible to produce a first valve characteristic curve by pressurizing one surface and to produce a second valve characteristic curve by pressurizing a second surface and a first surface. This is necessary since certain clutches or brakes are used at several speeds, for example, clutch C is pressurized in gears 2 and 6.

REFERENCE NUMERALS 1 input drive shaft
2 output drive shaft
3 pump
4 system pressure valve
5 selector switch
6 electrical pressure control valve
7 electrical pressure control valve
8 electrical pressure control valve
9 electrical pressure control valve
10 electrical pressure control valve
11 electrical pressure control valve
12 solenoid valve
13 channel
14 channel
15 reverse valve
16 channel
17 channel
18 emergency travel valve
19 switch valve
20 control valve
21 control valve
22 channel
23 control valve
24 valve
25 channel
26 channel
27 channel
28 channel
29 control valve
30 control valve
A clutch
B clutch
C brake
D brake
E clutch

What is claimed is:

1. An electronic-hydraulic control device of an automatic automobile transmission with hydraulically engageable and releasable friction clutches or brakes (A, B, C, D, E) used to select individual gears, their actuators each having a control valve (20, 21, 23, 30) with a microprocessor control device by means of which, depending on the operating parameters of the automobile transmission and a drive motor as well as of a device for influencing at least one of a shifting program and a driving program, the electrical operation of a solenoid valve (12) and of pressure control valves (6, 7, 8, 9, 10, 11) can be adjusted, wherein the feature that if the control device fails, the solenoid valve (12) and pressure control valves (6, 7, 8, 9, 10, 11) are de-energized, thereby switching at a previously engaged lower speed to a low gear and at a previously engaged higher speed, to a high gear.

2. The electronic-hydraulic control device according to claim 1, wherein the feature that when a lower gear is engaged by the control device, an emergency travel valve (18) is not pressurized and that an emergency travel valve (18) is pressurized when a higher gear is engaged by the control device.

3. The electronic-hydraulic control device according to claim 1, wherein the feature that a switching valve (19), connected hydraulically with an emergency travel valve (18), is switched if the control device fails when a lower gear has been previously engaged, thereby depressurizing the clutch or brake which must be shifted to a higher gear.

4. An electronic-hydraulic control device of an automatic automobile transmission with hydraulically engageable and releasable friction clutches and brakes (A, B, C, D, E) used to engage individual speeds, whose actuators each have a control device (20, 21, 23, 30) associated with it, with a microprocessor control device by means of which, depending on operating parameters of the automobile transmission and a drive motor as well as of a device for influencing at least one of a shifting program and a travel program, an electrically actuated solenoid valve (12) and of pressure control valves (6, 7, 8, 9, 10, 11) governing the actuators are adjusted, wherein the feature that control valves (20, 21, 23) have pressurizable surfaces of different dimensions whose forces are added to one another in the pressurized state.

5. The electronic-hydraulic control device according to claim 4, wherein the feature that the two pressurizable surfaces of the control valves are controlled when the clutch or brake (A, B, C, D, E) shifted by the control valve (20, 21, 23) is involved in shifting to a higher speed and only one pressurizable surface of the control valves is controlled when the clutch or brake (A, B, C, D, E) shifted by control valve (20, 21, 23) is involved in the shift to a lower speed.

6. The electronic-hydraulic control device of claim 1, wherein the low gear switched to when switching at a previously engaged lower speed is third gear.

7. The electronic-hydraulic control device of claim 1, wherein the high gear switched to when switching at a previously engaged higher speed is fifth gear.

8. A method of operation of an electronic-hydraulic control device of an automatic automobile transmission including a plurality of hydraulically engageable and releasable gear selection elements to select individual gears the gear selection elements including at least one of friction clutches and friction brakes and each gear selection element having an associated actuator, the actuators being controlled by an associated plurality of pressure control valves and an associated solenoid value and by a microprocessor control device responsive to operating parameters of the automobile transmission and a drive motor and a device for influencing at least one of a shifting program and a driving program, comprising the steps of:

when the control device fails,
de-energizing the solenoid valve and the pressure control valves, and
when the transmission has been previously engaged at a lower speed,
switching to a low gear, and
when the transmission has been previously engaged at a higher speed, switching to a high gear.

9. The method of operation of an electronic-hydraulic control device according to claim 8, wherein:

an emergency travel valve is un-pressurized when a lower gear is engaged by the control device, and
the emergency travel valve is pressurized when a higher gear is engaged by the control device.

10. The method of operation of an electronic-hydraulic control device according to claim 8, wherein:

when a lower gear has been previously engaged and the control device fails, a switching valve hydraulically connected with an emergency travel valve is switched to depressurize at least one gear selection element for switching to a high gear.

11. The method of operation of an electronic-hydraulic control device of claim 8 the control valves have pressurizable surfaces of different dimensions whose forces are added to one another in the pressurized state.

12. The method of operation of an electronic-hydraulic control device of claim 11, wherein the control valves have two pressurizable surfaces,
the two pressurizable surfaces of a control valve are controlled when the gear selection element shifted by the control valve is involved in shifting to a higher gear, and
one pressurizable surface of the control valve is controlled when the gear selection element shifted by the control valve is involved in the shift to a lower gear.

13. The method of operation of an electronic-hydraulic control device of claim 8, wherein the low gear switched to when switching at a previously engaged lower speed is third gear.

14. The method of operation of an electronic-hydraulic control device of claim 8, wherein the high gear switched to when switching at a previously engaged higher speed is fifth gear.

15. An electronic-hydraulic control device of an automatic automobile transmission including a plurality of hydraulically engageable and releasable gear selection elements to select individual gears, the gear selection elements including at least one of friction clutches and friction brakes and each gear selection element having an associated actuator, comprising:

the actuators,
a plurality of pressure control values wherein each actuator is controlled by at least one of the plurality of pressure control valves,
a solenoid valve associated with the pressure control valves, and
a microprocessor control device responsive to operating parameters of the automobile transmission and a drive motor and a device for influencing at least one of a shifting program and a driving program and controlling operation of the pressure control values and solenoid valve, wherein
when the control device fails,
the solenoid valve and the pressure control valves are de-energized, such that
when the transmission has been previously engaged at a lower speed, the transmission is switched to a low gear, and
when the transmission has been previously engaged at a higher speed, the transmission is switched to a high gear.

16. The electronic-hydraulic control device of claim 15, further comprising:

an emergency travel valve that is
un-pressurized when a lower gear is engaged by the control device, and
pressurized when a higher gear is engaged by the control device.

17. The electronic-hydraulic control device of claim 15, further comprising:

a switching valve hydraulically connected with an emergency travel valve that is switched to depressurize at least one gear selection element for switching to a high gear when a lower gear has been previously engaged and the control device fails.

18. The electronic-hydraulic control device of claim 15 wherein:

the control valves have pressurizable surfaces of different dimensions whose forces are added to one another in the pressurized state.

19. The electronic-hydraulic control device of claim 18, wherein:

the control valves have two pressurizable surfaces, the two pressurizable surfaces of a control valve are controlled when the gear selection element shifted by the control valve is involved in shifting to a higher gear, and one pressurizable surface of the control valve is controlled when the gear selection element shifted by the control valve is involved in the shift to a lower gear.

20. The electronic-hydraulic control device of claim 15, wherein:

the low gear switched to when switching at a previously engaged lower speed is third gear.

21. The electronic-hydraulic control device of claim 15, wherein:

the high gear switched to when switching at a previously engaged higher speed is fifth gear.

* * * * *